United States Patent [19]

Izutani

[11] Patent Number: 5,483,262
[45] Date of Patent: Jan. 9, 1996

[54] PEN HOLDING DEVICE FOR PEN-INPUT TYPE INFORMATION PROCESSOR

[75] Inventor: Kazuaki Izutani, Kyoto, Japan

[73] Assignee: Sharp Kabushiki Kaisha, Osaka, Japan

[21] Appl. No.: 219,261

[22] Filed: Mar. 29, 1994

[30] Foreign Application Priority Data

Mar. 31, 1993 [JP] Japan ................... 5-073405

[51] Int. Cl.⁶ ................................... G09G 3/02
[52] U.S. Cl. ................. 345/179; 345/156; 345/180; 345/905; 178/18; 364/708.1
[58] Field of Search ................... 345/179, 180, 345/181, 182, 183, 905, 163, 156; 178/18, 19, 87; 361/681, 682; 364/709.01, 710.01, 708.1; 382/13

[56] References Cited

U.S. PATENT DOCUMENTS

| | | | |
|---|---|---|---|
| 4,501,931 | 2/1985 | Ohya | 345/150 |
| 5,049,863 | 9/1991 | Oka | 364/709.01 |
| 5,179,502 | 1/1993 | Matsuda | 361/681 |
| 5,187,468 | 2/1993 | Garthwaite | 345/167 |
| 5,313,230 | 5/1994 | Venolia | 345/163 |

*Primary Examiner*—Ulysses Weldon
*Assistant Examiner*—Kent Chang

[57] ABSTRACT

A pen-input type information processor includes a pen holder for holding the pen, and a push type power switch provided on the pen holder. When the user takes out the pen after once pushing the pen downward, the power switch is turned on, starting power supply to the information processor. When the user puts the pen in the pen holder while pushing the pen downward, the power switch is turned off, and power supply to the information processor stops. In a preferred embodiment the pen can be replaced temporarily without turning on/off the power and switches are provided at each end of the pen holder to permit the holder to be used identically by either a left-handed or a right-handed user.

11 Claims, 9 Drawing Sheets

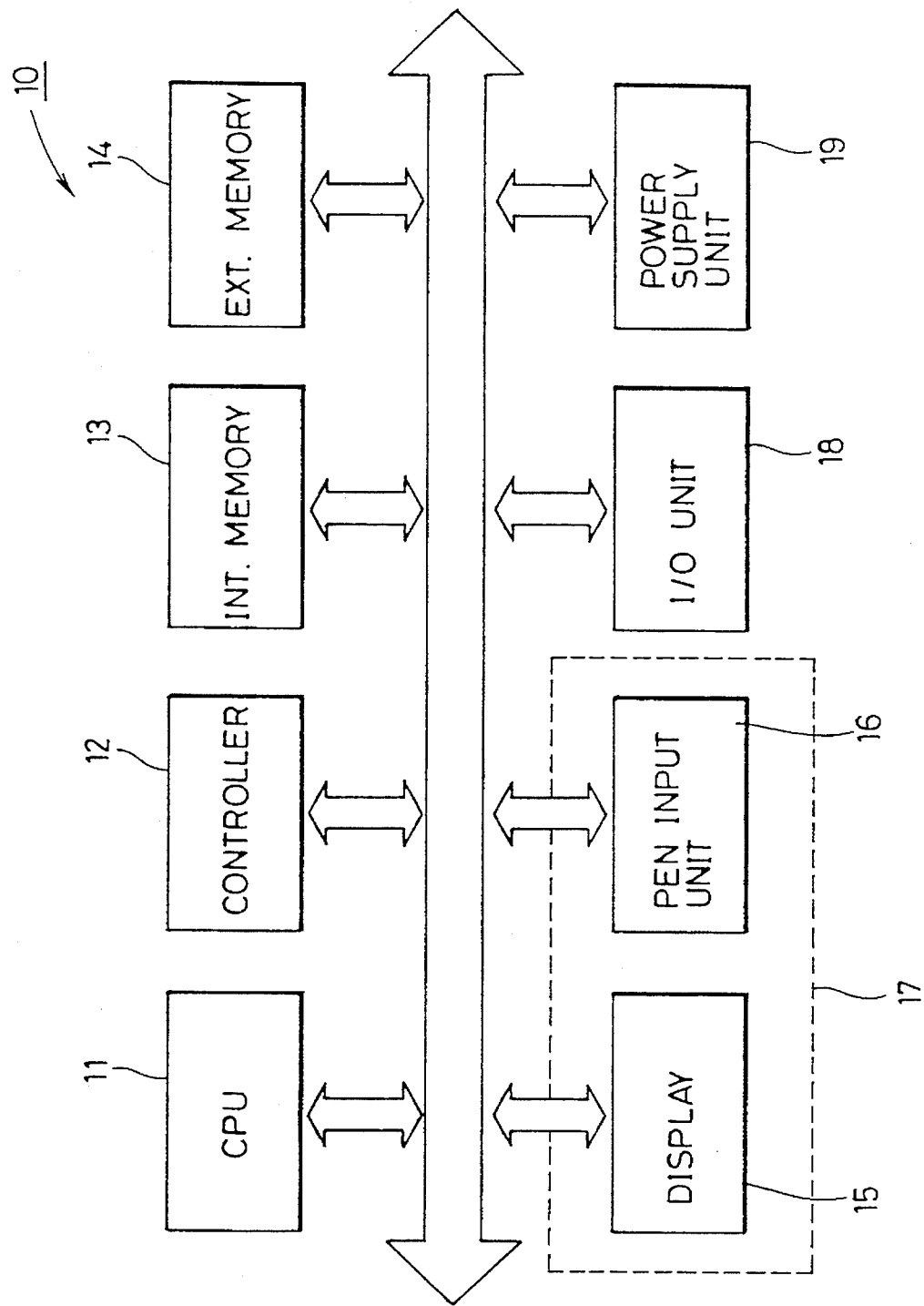

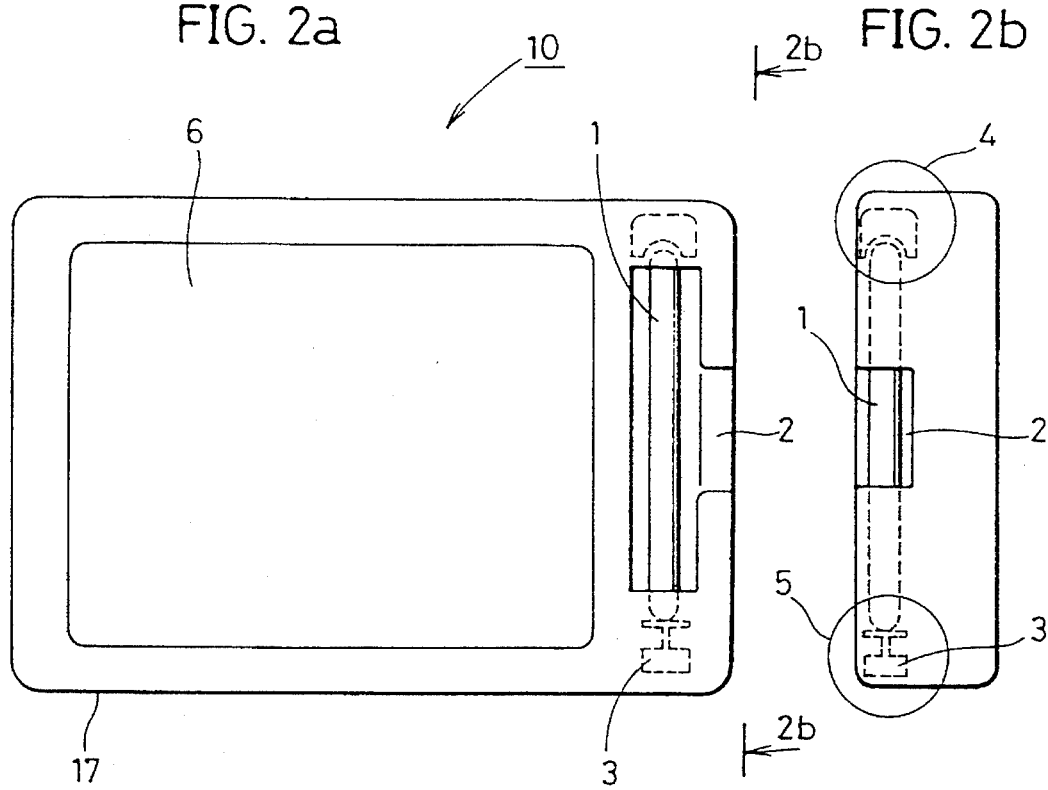
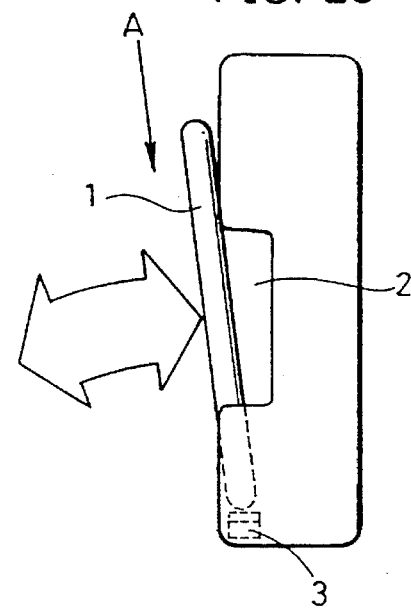

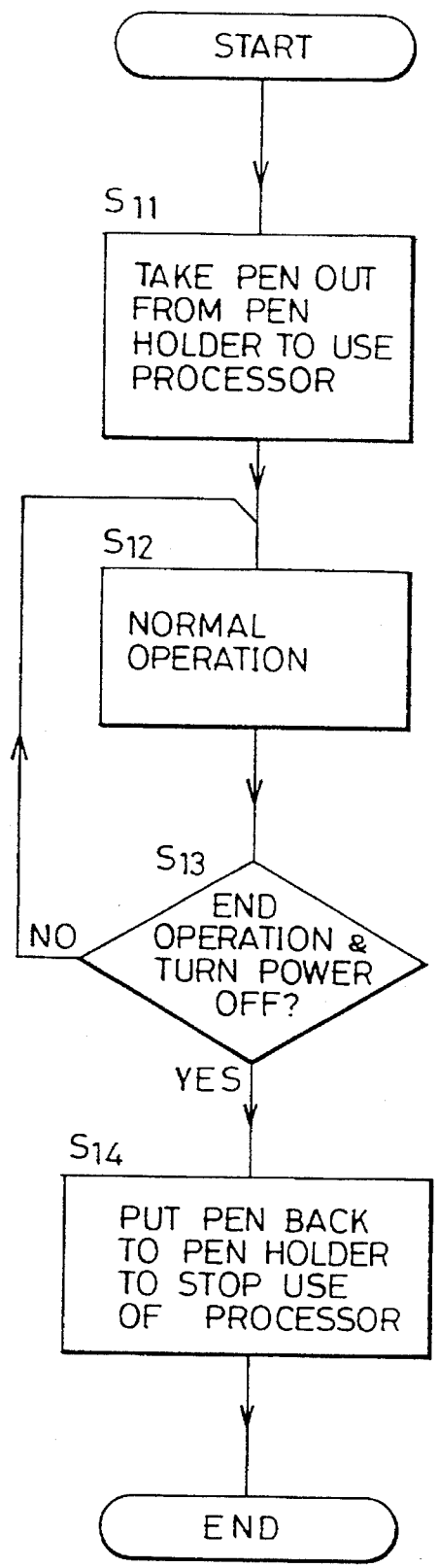

PEN HOLDING DEVICE FOR PEN-INPUT TYPE INFORMATION PROCESSOR

BACKGROUND OF THE INVENTION

1. Field of the Invention

The present invention relates to an information processor provided with an input unit, and more specifically to an information processor such as a word processor to which information is input by means of a pen.

2. Description of the Related Art

An information processor to which information is input by means of a pen of interest to the present invention is disclosed in, for example, Japanese Patent Laying-Open Nos. 2-100712 and 2-125324. FIG. 9 is a schematic illustration of the information processor disclosed in Japanese Patent Laying-Open No. 2-125324. Referring to FIG. 9, the information processor includes a pen housing 2 and a power switch 10. Pen housing 2 and power switch 10 are provided separately. In accordance with the above article, when a pen 1 is not held in pen housing 2 while power switch 10 is off, absence of pen 1 in pen housing 2 is detected and alarm is given to the user, so as to prevent pen 1 from being lost.

Conventionally, the pen of the information processor is prevented from being lost in the above described manner. However, for this purpose, the user must carry out two operations, that is, to put the pen in the housing, and to turn on/off the power.

Meanwhile, the user of the information processor using a pen for information input may be left-handed or right-handed. Right-handed person and left-handed persons may prefer different arrangements of power switch 10 and pen housing 2. If such preference is taken into consideration so as to provide user-friendly processors, configuration of the processor may vary, and the operation manual may become complicated.

SUMMARY OF THE INVENTION

Therefore, an object of the present invention is to provide a pen-input type information processor which answers user's needs by simple operation.

Another object of the present invention is to provide a pen-input type information processor in which missing of the pen can be prevented by a simple structure.

Another object of the present invention is to provide a pen-input type information processor which is easy to use by both left-handed and right-handed persons.

A still further object of the present invention is to save power in a pen-input type information processor.

The above described objects of the present invention can be attained by a pen-input type information processor including the following components. More specifically, the pen-input type information processor in accordance with the present invention includes a holder for holding a pen. The holder includes a support for supporting a part of the pen in a first direction and a power supply unit for turning on/off the power of the processor when the support is guided by a prescribed amount to a second direction, which is opposite to the first direction, whereby the processor is turned on/off in response to ejection/insertion of the pen.

Since the power of the processor is turned on/off when the support, which moves in accordance with insertion and ejection of the pen, is moved by a prescribed amount, the power of the processor is turned on/off when the pen is taken out or put in. Since power on/off of the processor is associated with the housing of the pen, a separate switch for the processor can be dispensed with. This simplifies the structure of the pen-input type information processor. Since the power is turned on only when the pen is taken out from the housing, power can be saved, and in addition, since the user puts the pen back in the housing when he or she does not use the processor, the pen may not be lost.

Preferably, the prescribed amount of movement of the support includes a first prescribed amount and a second prescribed amount, and the processor further includes a controller which controls the processor to be turned on/off when the support is moved by the second prescribed amount, while not turned on/off when the support is moved by the first prescribed amount. Since the processor is not turned on/off when the support is moved only by the first prescribed amount, the user may put the pen in the housing without turning off the power of the processor. This further facilitates use of the pen-input type information processor.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing main portions of the information processor to which the input unit in accordance with the present invention is applied.

FIGS. 2a, 2b and 2c show respective views of a first embodiment of an input unit of the information processor in accordance with the present invention.

FIG. 4 is a flow chart showing the operation of the input unit of the first embodiment.

Figures 3A, 3B, 3C, 3D:
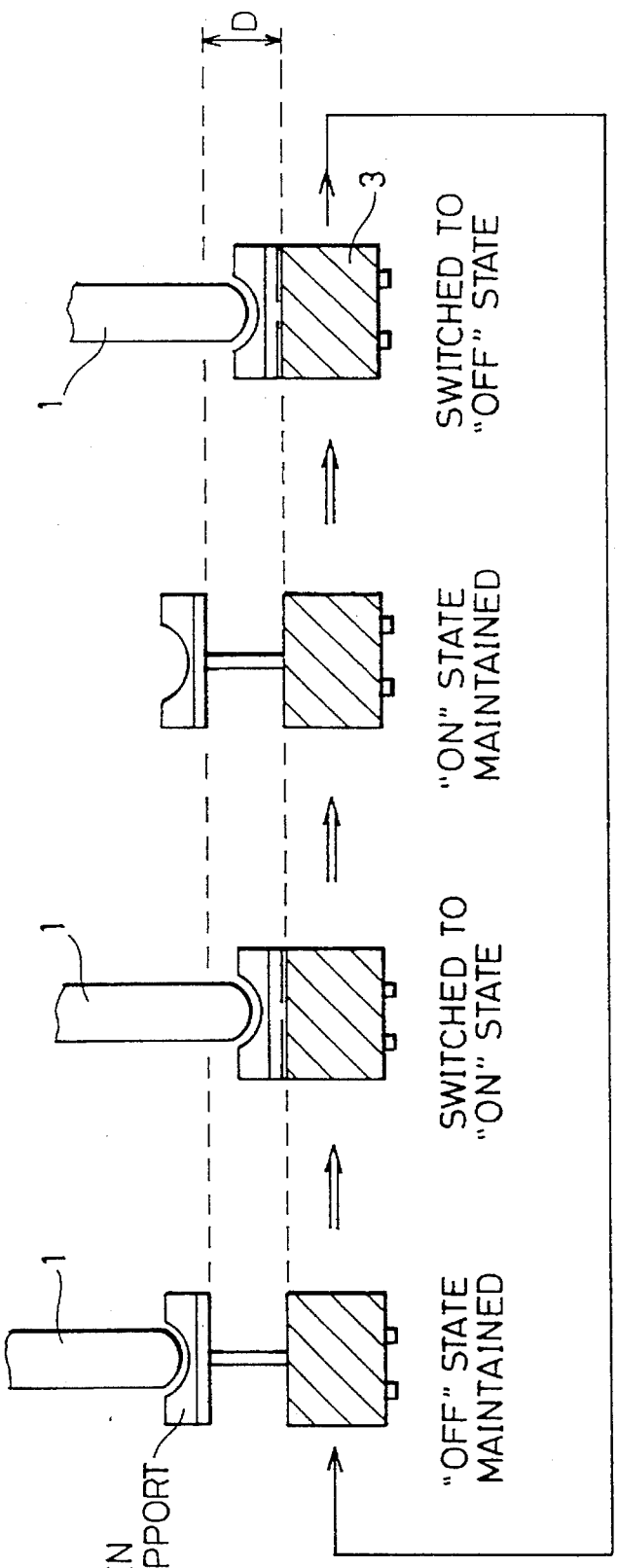
FIGS. 3a–3d of switching power on/off of the input unit in accordance with the first embodiment of the present invention.

DESCRIPTION OF THE PREFERRED EMBODIMENTS (1) First Embodiment

Referring to FIG. 1, the pen-input type information processor 10 includes a central processing unit 11 controlling the processor as a whole, a controller unit 12 for controlling various units, and internal memory unit 13 for storing control program of the processor and input data, an external memory unit 14, a display unit 15 for displaying input information and the like, a pen input unit 16 for inputting information through a pen, an input/output unit 18 for inputting data other than pen input and for outputting data by means of, for example, a printer, and a power supply unit 19 for supplying power to the processor. These units are connected to each other by means of buses. Display unit 15 and pen input unit 16 may be provided as one unit 17.

FIGS. 2a to 2c are a front view (FIG. 2a), a side view (FIG. 2b) showing the state of holding the pen and a side view (FIG. 2c) showing the state of ejecting the pen of the pen input unit 16 shown in FIG. 1.

Referring to FIGS. 2a to 2c, pen-input type information processor 10 includes a display portion (corresponding to unit 17 of FIG. 1) and an input pen holder 2. Pen holder 2 includes an upper pen holding portion 4 and a lower pen holding portion 5, and input pen 1 is held inbetween. Lower pen holding portion 5 includes a push type power switch 3 such that the power switch is toggled on/off by the pushing of push type power switch 3.

FIGS. 3a–3d show positions of a pen support 31 of push type power switch 3 and the state of the switch at respective states. FIG. 3a shows a state in which pen 1 is held by the holder 2, as shown in FIG. 2a. At this state, the information processor 10 is off. FIG. 3b shows a state in which the information processor is switched to on. FIG. 3c shows a state wherein the pen is removed with the power to the information process maintained in the "on" state. FIG. 3d shows the state in which the information processor is switched to an "off" state.

FIG. 4 is a flow chart showing the content of operation of the information processor in accordance with the first embodiment. The operation method of the processor will be described with reference to FIGS. 2a to 2c, 3 and 4. For use, the user takes out pen 1 by pushing pen 1 to the direction of the arrow A (FIG. 2c) so as to push power switch 3, as shown in FIG. 3(b). At this time, information processor 10 is turned on (in step S11 of FIG. 4 hereinafter the term "step" will be omitted).

In this state, the user inputs information to display unit 6 by means of pen 1 (S12). Since pen support 31 of push type power switch 3 is biased upward, pen support 31 is raised upward by D from the body of switch 3 as shown in FIG. 3(c) and is returned to the original state. In this state, the power is kept on.

When processing by the information processor 10 is completed, the user determines whether or not the power should be turned off (S13). When the power should be turned off (YES in S13), the user puts pen 1 in pen holder 2 by pushing pen 1 in the direction of the arrow A as shown in FIG. 2c. This state corresponds to FIG. 3(d). Since pen support 31 is pressed downward by D again, power switch 3 is turned off. After the power switch 3 is turned off, it returns to the position of FIG. 3(a).

In accordance with this embodiment, since power of information processor 10 is kept on only while the user is using pen 1 out from the holder 2, it is not necessary to provide a separate switch on the processor. Further, the user does not need any specific operation for turning on the power of the processor. In addition, since the processor is kept on only during the use, power can be saved.

(2) Second embodiment

Figures 5A, 5B, 5C:
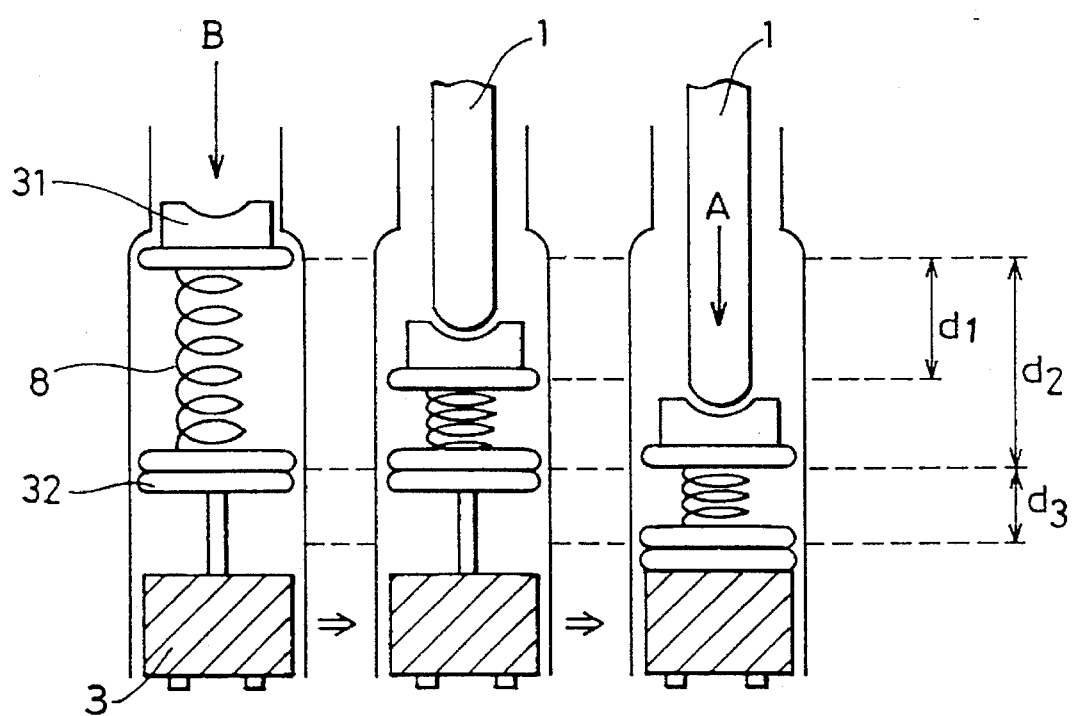
FIGS. 5a–5c shows states of switching power on/off of the input unit in accordance with a second embodiment of the present invention.
Figure 6:
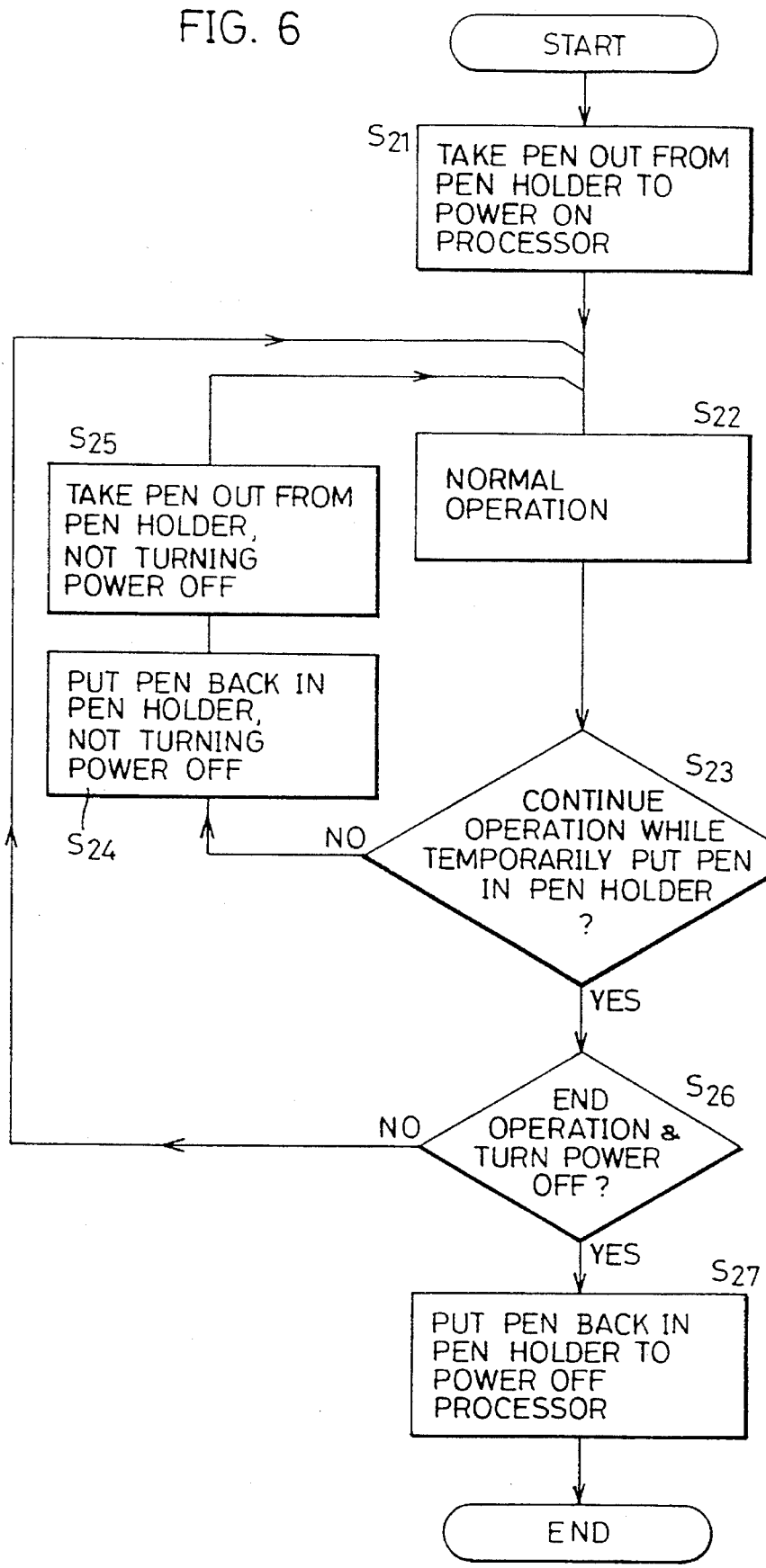
FIG. 6 is a flow chart showing the operation of the input unit of the second embodiment.

FIGS. 5a–5c show a second embodiment of the present invention, which corresponds to FIG. 3 of the first embodiment. In this second embodiment also, the overall structure of information processor 10 and the method of taking out and putting in pen 1 are the same as those shown in FIGS. 2a to 2c. FIG. 6 is a flow chart of the second embodiment, which corresponds to FIG. 4 of the first embodiment.

The second embodiment of the present invention will be described with reference to FIGS. 2a to 2c, 5 and 6. Referring to FIGS. 5a–5c, at the lower pen holding portion 5 of pen holder 2 in the second embodiment, there are provided a push type power switch 3 similar to the first embodiment, and a spring biased spacer 8 provided on push type power switch 3. A pen support 31 is provided on spring biased spacer 8.

When depressed by pen 1 in the direction of the arrow B (FIG. 5a), spring biased spacer 8 is shrunk by a pen holding stroke d1 at first (FIG. 5a). However, in this state, an upper plate 32 of power switch 3 is not depressed to the side of switch 3. This operation can be realized by setting compression starting pressure of the spring of spacer 8 to be smaller than that of switch 3. When pen 1 is pushed down by a stroke d2 as shown in FIG. 5c, plate 32 is pushed down accordingly by a power switch stroke d3, and hence information processor 10 is powered on.

A specific method of using information processor 10 will be described. First, in order to use information processor 10, the user takes out pen 1 by pressing pen 1 in the direction of the arrow A as shown in FIG. 2c from pen holder 2, and power to the information processor 10 is turned on (S21 of FIG. 6). In this state, the user inputs data on display unit 6 integral with pen input unit 16 by using pen 1 (S22). When the user wishes to continue his operation while temporarily putting the pen in the holder (NO in the S23), the user puts the pen 1 in pen holder 2 by pushing pen 1 by the stroke d1 as shown in FIG. 5(b) (S24). Since plate 32 of power switch 3 is not pressed to the side of switch 3 in this state, the power is kept on. If necessary, the user takes out pen 1 again as shown in FIG. 2c. However, at this time, it is not necessary to push pen 1 in the direction of arrow A (as shown in FIG. 5c).

When operation by information processor is completed and the user wishes to turn off the power (S26 of FIG. 6), the user puts the pen 1 in the holder by pushing pen 1 in the direction of the arrow A by the stroke d2 (S27). This state corresponds to FIG. 5c. An LED for indicating whether or not the power switch 3 is actually turned on/off may be provided on the body of the processor 10.

As described above, in accordance with the second embodiment of the present invention, the user can put the pen 1 in holder 2 while the power is kept on, and therefore an information processor which can be used as desired by the user can be provided. Further, since the pen 1 can be put in the holder of processor 10 when it is not used while the power is on, the pen may not be lost.

Figure 7A:
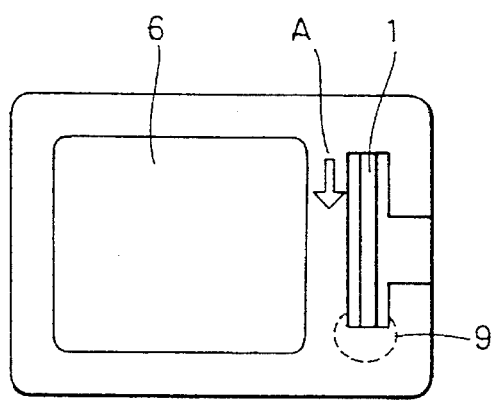
FIGS. 7a to 7c show variations and a third embodiment of the input unit in accordance with the present invention.
Figure 7B:
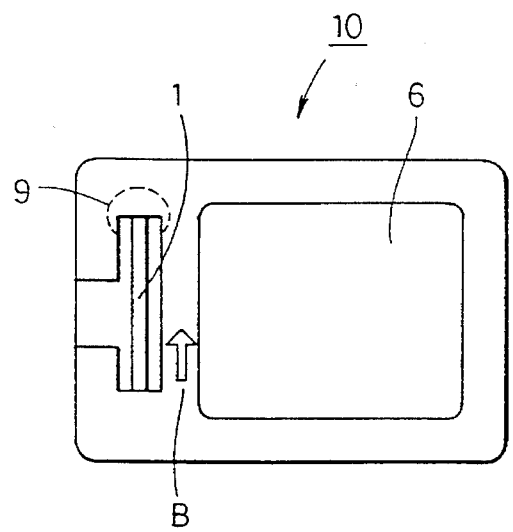

In the above described embodiments, downward force is utilized for putting the pen in or taking the pen out from the pen holder (FIG. 7a). This is generally useful for right-handed person. The present invention may be modified as shown in FIG. 7b so as to be convenient for left-handed person. More specifically, referring to FIG. 7b, the holder of pen 1 is provided on the left side of display unit 6, and the power on/off of the processor is controlled by applying upward force by pen 1 onto the holder 2 as shown by the arrow B in the figure.

(3) Third embodiment

The third embodiment of the present invention will now be described. In this third embodiment also, the basic structure of the processor is the same as the first and second embodiments, and thus only the different points will be described.

Figure 7C:
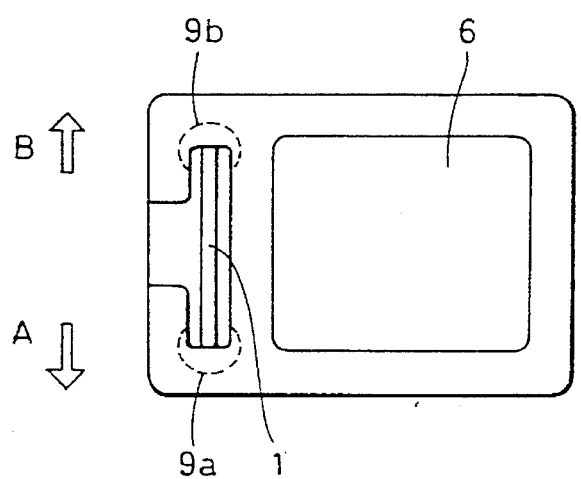

FIG. 7c shows a third embodiment of the present invention which is the combination of FIGS. 7a and 7b. In this embodiment, a power switch 3 is provided at each of the upper and lower end portions 9 of pen holder 2.

This provides a pen-input type information processor which is convenient for both left-handed and right-handed persons. Though pen holder 2 is provided on the left side of display unit 6 in FIG. 7c, the same effect can be obtained when it is provided on the right side.

Figure 8A:
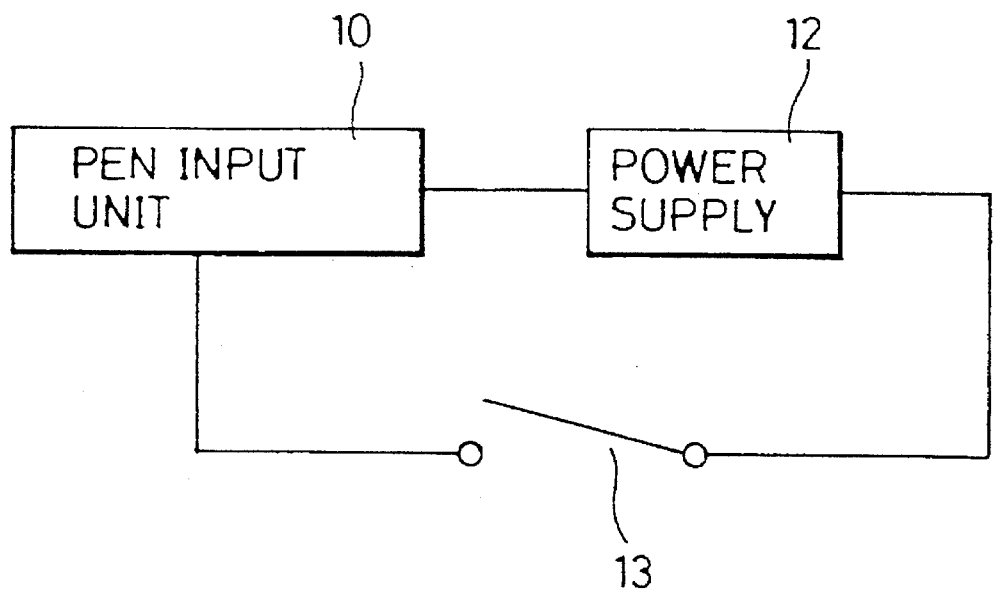
FIGS. 8a and 8b are circuit diagrams of the above embodiment of the input unit in accordance with the present invention.
Figure 8B:
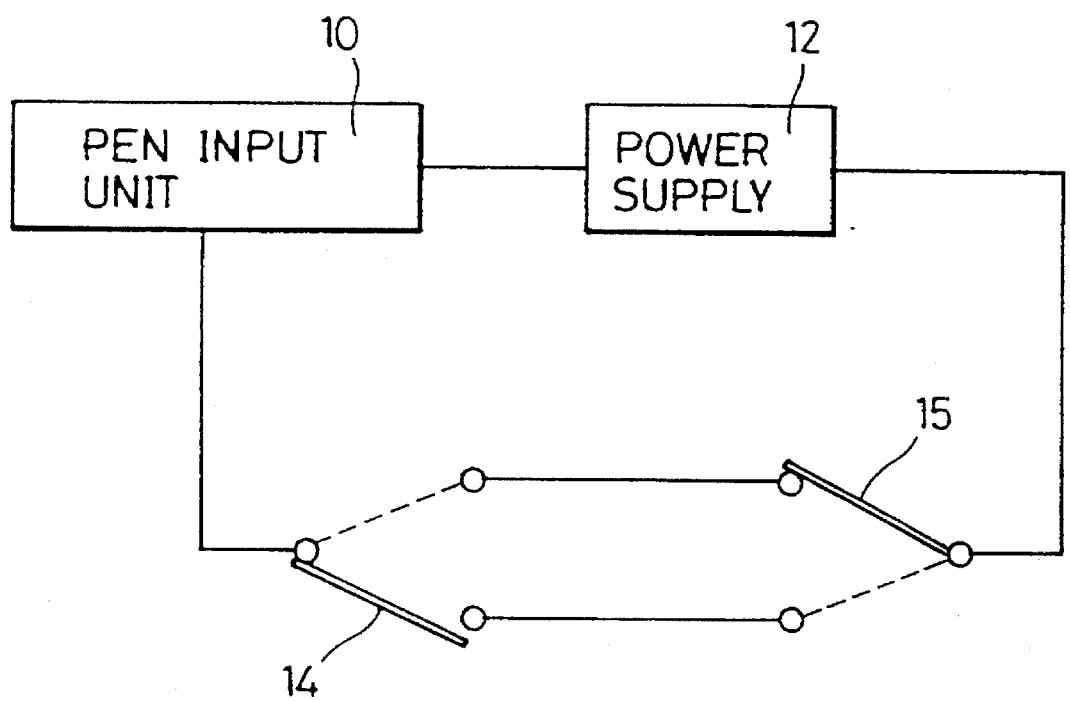
Figure 9:
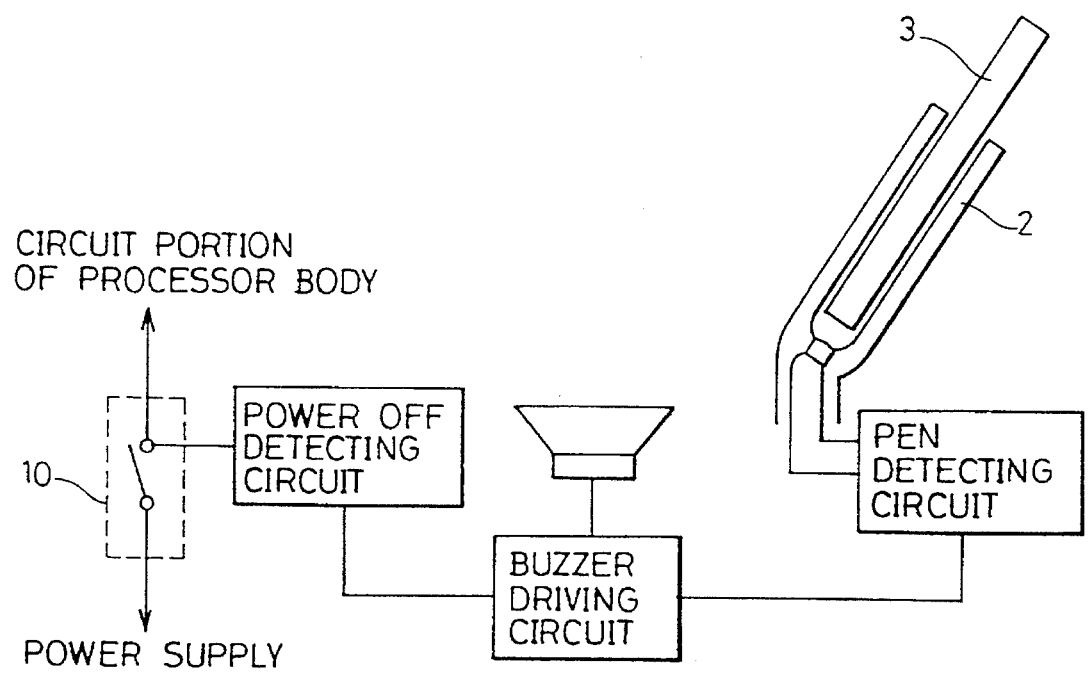
FIG. 9 shows a conventional input unit of an information processor.

A specific electric circuit for each of the above embodiments will be described. FIGS. 8a and 8b show electric circuits of the information processor in accordance with the present invention. FIG. 8a corresponds to the example in which only one power switch 13 is provided, which corresponds to the first and second embodiment as well as FIG. 7b of the third embodiment. Meanwhile, FIG. 8b shows an example in which two power switches 14 and 15 are provided, which corresponds to FIG. 7c of the third embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information processor to which information is input through a pen, comprising
    pen holding means including
        (a) means for supporting a portion of said pen in a first direction, said means for supporting being movable in opposite directions, and
        (b) switching means for turning on/off power of said processor when said supporting means is moved by a prescribed amount in a second direction, which is opposite to said first direction, in response to ejection/insertion of said pen from and to said holding means, whereby the processor is turned on/off in response to ejection/insertion of the pen.

2. The processor according to claim 1, wherein
    said pen holding means has a first end portion and a second end portion opposing the first end portion, and said switching means is provided on said first end portion and said second end portion.

3. An information processor to which information is input through a pen, comprising:
    pen holding means including
        (a) means for supporting a portion of said pen in a first direction,
        (b) switching means for turning on/off power of said processor when said supporting means is moved by a prescribed amount in a second direction, which is opposite to said first direction, in response to ejection/insertion of said pen from and to said holding means, whereby the processor is turned on/off in response to ejection/insertion of the pen
    wherein said prescribed amount includes a first prescribed amount and a second prescribed amount, and
    said processor further comprising
        control means for controlling said switching means such that said switching means is not operated by said first prescribed amount but operated by said second prescribed amount.

4. The processor according to claim 3, wherein
    said pen holding means includes a first end portion and a second end portion opposing to said first end portion, and
    said switching means is provided on said first and second end portions.

5. In an information processor to which information is input through a pen, the improvement comprising:
    first support means for supporting one end of said pen such that: when the pen is at a first position axially with respect to said first support means, the pen is secured from moving in one axial direction and all directions which are lateral to the axis of the pen; and, when the pen is moved by at least a given amount in the other axial direction, it is free of the first support means;
    second, moveable, support means for supporting the other end of said pen such that, when the pen is supported by the second means, the pen is biased axially in the direction of the first support means; and
    means for turning on/off power to said information processor when said second support means is moved at least a fixed distance away from the first support means.

6. The apparatus of claim 5, further comprising: means, forming part of said second, moveable, support means, for supporting said other end of said pen laterally when the pen is not in use by the user.

7. The apparatus of claim 5, further comprising: means, forming part of said second support means, for switching on/off power to said processor when said pen is moved axially a given distance in the direction away from said first support means.

8. The apparatus of claim 7, further comprising: means, forming part of said second support means, for permitting said pen to be inserted in said pen holding means and to be supported laterally thereby, without switching on/off power to said processor.

9. In an information processor to which information is input through a pen, the improvement comprising:
    first, moveable, support means for supporting one end of said pen such that: when the pen is at a first position axially with respect to said first support means, the pen is biased in a first axial direction and prevented from moving in all directions which are lateral to the axis of the pen; and, when the pen is moved by at least a given amount in the first axial direction, the pen becomes free of the first support means;
    second, moveable, support means for supporting the other end of said pen such that, when the pen is supported by the second means, the pen is biased axially in the direction of the first support means; and
    means for turning on/off power to said information processor when said second support means is moved at least a fixed distance away from the first support means; and
    means for turning on/off power to said information processor when said first support means is moved at least a fixed distance from the second support means.

10. The apparatus of claim 9, further comprising: means, forming part of said first support means, for supporting one end of said pen laterally when the pen is not in use by the user.

11. The apparatus of claim 9, further comprising: means, forming part of said second support means, for supporting the other end of said pen laterally when the pen is not in use by the user.

* * * * *